US012598170B2

(12) United States Patent

Albero et al.

(10) Patent No.: US 12,598,170 B2

(45) Date of Patent: Apr. 7, 2026

(54) REVERSE AUTHENTICATOR OF VIRTUAL OBJECTS AND ENTITIES IN VIRTUAL REALITY COMPUTING ENVIRONMENTS

(71) Applicant: BANK OF AMERICA CORPORATION, Charlotte, NC (US)

(72) Inventors: George Anthony Albero, Charlotte, NC (US); Olga Kocharyan, Matthews, NC (US); Elizabeth Rhodes Kral, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 220 days.

(21) Appl. No.: 18/138,798

(22) Filed: Apr. 25, 2023

(65) Prior Publication Data

US 2024/0364673 A1      Oct. 31, 2024

(51) Int. Cl.
H04L 9/40 (2022.01)
H04L 67/131 (2022.01)

(52) U.S. Cl.
CPC ............ H04L 63/08 (2013.01); H04L 67/131 (2022.05)

(58) Field of Classification Search
None
See application file for complete search history.

(56) References Cited

U.S. PATENT DOCUMENTS 6,028,940 A    2/2000  Tanaka et al.
10,721,280 B1 *  7/2020  Heppner ............... H04L 65/403

2017/0039770 A1 *  2/2017  Lanier ................... H04W 12/02
2019/0227695 A1 *  7/2019  Shuster ................... G06T 11/60
2020/0258278 A1 *  8/2020  Mirhosseini ............ G06F 3/011
2023/0237192 A1 *  7/2023  Kahan ................... G01C 21/00
                                                     726/1
2024/0160272 A1 *  5/2024  Soryal ................... G06F 3/011
2025/0021164 A1 *  1/2025  Cui ........................ A63F 13/42

FOREIGN PATENT DOCUMENTS

JP        2001052125 A     2/2001
JP        2001312450 A    11/2001
KR    1020020022511 A     3/2002
WO       2023080506 A1    5/2023

* cited by examiner

*Primary Examiner* — Philip J Chea
*Assistant Examiner* — James Ross Hollister
(74) *Attorney, Agent, or Firm* — Moore & Van Allen PLLC; Nicholas C. Russell

(57)                    ABSTRACT

Reverse authentication of (i) virtual objects (e.g., avatars or the like) located in or proximate to sub-environments of virtual reality computing environments and, in some embodiments, (ii) the sub-environments themselves. The virtual object is authenticated as being associated with an individual/associate of the entity in control of the sub-environment and/or the sub-environment is authenticated as being associated with/controlled by the entity and, in response, a sensory-perceptible indicator (e.g., audible, visual, haptic indicator) is obtained/generated, which is communicated to a user device that outputs the sensory-perceptible indicator to notify the virtual reality user that the virtual object and/or sub-environment has been authenticated. Communication of the sensory-perceptible indicator and/or output of the sensory-perceptible indicator on the user device may be external to the virtual reality computing environment and, as such, may be communicated to and/or outputted on a user device different than the user device on which the virtual reality experience occurs.

16 Claims, 4 Drawing Sheets

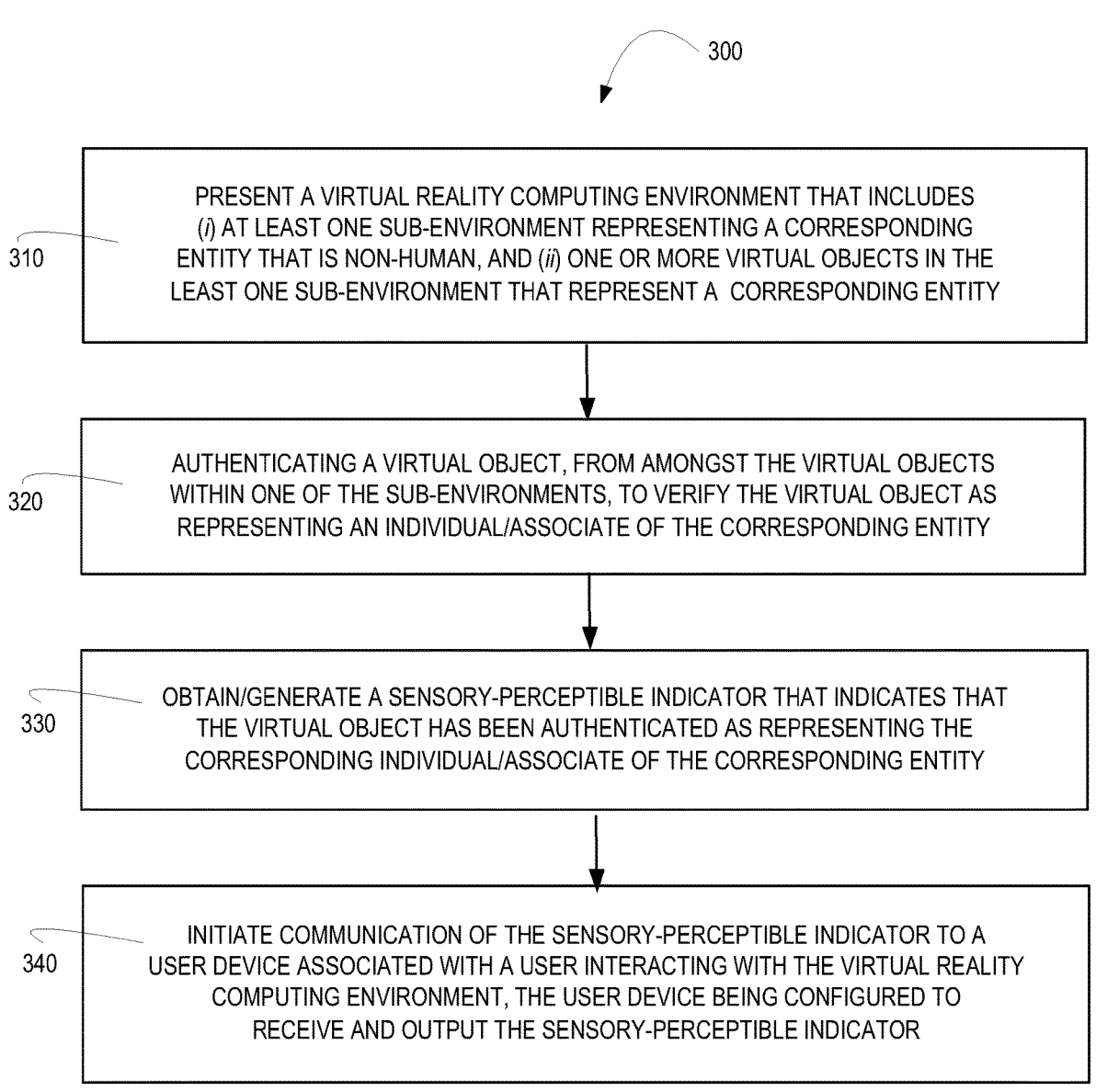

300

PRESENT A VIRTUAL REALITY COMPUTING ENVIRONMENT THAT INCLUDES (*i*) AT LEAST ONE SUB-ENVIRONMENT REPRESENTING A CORRESPONDING ENTITY THAT IS NON-HUMAN, AND (*ii*) ONE OR MORE VIRTUAL OBJECTS IN THE LEAST ONE SUB-ENVIRONMENT THAT REPRESENT A  CORRESPONDING ENTITY

310

AUTHENTICATING A VIRTUAL OBJECT, FROM AMONGST THE VIRTUAL OBJECTS WITHIN ONE OF THE SUB-ENVIRONMENTS, TO VERIFY THE VIRTUAL OBJECT AS REPRESENTING AN INDIVIDUAL/ASSOCIATE OF THE CORRESPONDING ENTITY

320

OBTAIN/GENERATE A SENSORY-PERCEPTIBLE INDICATOR THAT INDICATES THAT THE VIRTUAL OBJECT HAS BEEN AUTHENTICATED AS REPRESENTING THE CORRESPONDING INDIVIDUAL/ASSOCIATE OF THE CORRESPONDING ENTITY

330

INITIATE COMMUNICATION OF THE SENSORY-PERCEPTIBLE INDICATOR TO A USER DEVICE ASSOCIATED WITH A USER INTERACTING WITH THE VIRTUAL REALITY COMPUTING ENVIRONMENT, THE USER DEVICE BEING CONFIGURED TO RECEIVE AND OUTPUT THE SENSORY-PERCEPTIBLE INDICATOR

REVERSE AUTHENTICATOR OF VIRTUAL OBJECTS AND ENTITIES IN VIRTUAL REALITY COMPUTING ENVIRONMENTS

FIELD OF THE INVENTION

The present invention is related generally to computing network security and, more specifically, systems and methods for authenticating entities and virtual objects representing entities in augmented and/or virtual reality computing environments, such as, the Metaverse.

BACKGROUND

The use of augmented and/or virtual reality computing environments (collectively referred to herein as "virtual reality computing environments) have become increasing more prevalent. By way of example, the Metaverse is a hypothetical iteration of the Internet as a single, universal and immersive virtual reality computing environment that is facilitated by the use of virtual reality and augmented reality headsets. Thus, the Metaverse provides the ability for a user to associate with an avatar (i.e., a virtual representation/object of the user) and for the avatar to conduct resource exchange events within a virtual environment. While the resource exchange event is initiated entirely within the virtual environment, it results in an actual exchange of resources between the user and the resource-providing entity.

Such virtual environment-based resource exchange events pose security threats. Specifically, resource-providing entities in Metaverse or other virtual reality computing environments may not be who they purport to be (i.e., nefarious entities masquerading as the intended resource providing entity. Since the resource exchange event is occurring in a virtual environment, the measures that need to be taken to address such security threats may be different than those taken to address non-virtual (e.g., physical or online) resource exchange events.

Therefore, a need exists to develop systems, methods, computer program products and the like which provide security within virtual reality computing environments, such as the Metaverse, specifically heightened security to resource exchange events that occur in a virtual reality computing environment. In this regard, the desired systems, methods and the like should provide verification/authentication of (i) resource-providing entities (i.e., non-human entities) that typically occupy a region/zone/sub-verse of the virtual reality computing environment (referred to herein as a "sub-environment") and (ii) the virtual objects (e.g., avatars or the like) representing the resource-providing entity that current occupy the sub-environment. In this regard, the desired systems, methods and the like should serve to verify that the resource-providing entities are who they purport to be and that the virtual objects/avatars representing the resource providing entities that are currently residing in the entity's sub-environment are, in fact, representatives of the resource-providing entity.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for reverse authentication of virtual objects (e.g., avatars or the like) located in sub-environments associated with entities and, in some embodiments, the sub-environments themselves. Specifically, embodiments of the present invention authenticate the virtual object and/or sub-environment and, in response, obtain a sensory-perceptible indicator (e.g., audible, visual, haptic indicator), which is communicated to a user device that outputs the sensory-perceptible indicator to notify the virtual reality computing environment user that the virtual object and/or sub-environment has been authenticated (i.e., the virtual object has been verified as being associated with an individual/representative of the entity in control of the sub-environment and/or the sub-environment has been verified as being associated with the entity).

In specific embodiments of the invention, the generation of and/or communication of the sensory-perceptible indicator is triggered by the virtual reality user (i.e., their respective virtual object/avatar) interacting with or being proximate to the virtual object and/or being located within or proximate to the sub-environment.

In other specific embodiments of the invention, the sensory-perceptible indicator is communicated to the user device and/or outputted by the user device external to the virtual reality computing environment (e.g., the sensory-perceptible indicator is communicated via the Internet or some other non-virtual reality network and/or is displayed, heard or otherwise experienced by the user outside of the virtual reality computing application/environment). As such, in specific embodiments of the invention, the sensory-perceptible indicator may be communicated to and/or outputted on the same user device that the virtual reality user is actively experiencing the virtual reality environment (e.g., virtual reality headset, smart glasses or the like), while in other embodiments of the invention the sensory-perceptible indicator may be communicated to and/or outputted on a different user device (e.g., smart phone or the like) other than the user device that the virtual reality user is actively experiencing the virtual reality environment.

In specific embodiments of the invention, the sensory-perceptible indicator is an audible indicator. The audible indicator may be a predetermined sound, such as a ping or a chime that is played to indicate that the virtual object and/or sub-environment has been authenticated. In other instances, the audible indicator may be a recorded message, which may be dynamically generated to include the identity of the individual associated with the virtual object and/or the identity of the entity. In other specific embodiments of the invention, the sensory-perceptible indicator is an audible indicator is a visual indicator. The visual indicator may be a pop-up message displayed in the virtual reality computing environment or external to the virtual reality computing environment (e.g., a notification displayed on a smart phone). In addition, the visual indicator may be a text message (i.e., Short Message Service (SMS) message) or the like. The pop-up message or the text message may be configured to include the identity of the individual associated with the virtual object and/or the identity of the entity. Further, the visual indicator may be flashing lights or color changes of the virtual object and/or within the background of the sub-environment. In other specific embodiments of the invention, the sensory-perceptible indicator may be a haptic indicator, such as vibration provided to the user device. It should be noted that in additional embodiments of the invention any combination of visual, audible and haptic indicators may be used.

In other embodiments of the invention, a sensory-perceptible indicator may be obtained or otherwise generated and communicated to the user device for output in response to the virtual reality user (i.e., their respective virtual object/avatar) interacting with or being proximate to a virtual object that has not been authenticated as being associated with an individual associated with the entity or a sub-environment that has not been authenticated as being associated with the entity. In this regard, the virtual reality user is notified when they interact with or are proximate to non-authenticated virtual objects within a sub-environment and/or un-authenticated sub-environments. Such notifications may be in lieu of virtual object and/or sub-environment authentication notifications or, in other embodiments of the invention, in addition to virtual object and/or sub-environment authentication notifications.

A system for providing authentication in a virtual reality computing environment defines first embodiments of the invention. The system includes a computing platform having a memory and one or more computing processor devices in communication with the memory. The memory stores a virtual reality application that is executable by at least one of the one or more computing processor devices. The virtual reality application is configured to present a virtual reality computing environment that includes at least one sub-environment representing a corresponding entity that is non-human and one or more virtual objects in the least one sub-environment, each virtual object representing a corresponding first individual associated with the corresponding entity. The memory additionally stores an authentication application that is executable by at least one of the one or more computing processor devices. The authentication application is configured to authenticate a virtual object from amongst the one or more virtual objects within a sub-environment from amongst the at least one sub-environment. Authentication serves to verify that the virtual object as representing a corresponding first individual associated with the entity. In response to authentication, authentication application is configured to obtain a first sensory-perceptible indicator that indicates that the virtual object is authenticated as representing the corresponding first individual associated with the entity, and initiate communication of the first sensory-perceptible indicator to a user device associated with a user of the virtual reality application. The user device is configured to receive and output the first sensory-perceptible indicator. In specific embodiments of the system, the user device outputs the sensory-perceptible indicator external to the virtual reality computing environment.

In specific embodiments of the system, the authentication application is further configured to initiate communication of the first sensory-perceptible indicator to the user device in response to the user executing the virtual reality application and virtually coming in contact with or being proximate to the virtual object. In related embodiments of the system, the user device is a first user device and the virtual reality application is executed on a second user device that is different than the first user device. While in other related embodiments of the invention, the virtual reality application is executed on the user device (i.e., the same user device that outputs the sensory-perceptible indicator).

In further embodiments of the system, the authentication application is further to authenticate a sub-environment from amongst the at least one sub-environment, wherein authenticating verifies the sub-environment as representing a corresponding entity. In related embodiments of the system, the authentication application is further configured to obtain the first sensory-perceptible indicator that further indicates that the sub-environment is authenticated as representing the corresponding entity. While in other related embodiments of the system, the authentication application is further configured to obtain a second sensory-perceptible indicator that indicate that the sub-environment is authenticated as representing the corresponding entity, and initiate communication of the second sensory-perceptible indicator to the user device associated with the user of the virtual reality application. In related embodiments of the system, the authentication application is configured to initiate communication of the second sensory-perceptible indicator to the user device in response to the user executing the virtual reality application and virtually coming in contact with or being proximate to the sub-environment.

In further specific embodiments of the system, the authentication application is configured to obtain the first sensory-perceptible indicator as an audible indicator. In related embodiments of the system, the audible indicator is (i) a predetermined sound (e.g., a ping, chime or the like), such that, the user device is configured to output the predetermined sound to notify the user that the virtual object is authenticated or (ii) a recorded voice message that upon output by the user device provides identification of the first individual represented by the virtual object.

In other specific embodiments of the system, the authentication application is configured to obtain the first sensory-perceptible indicator as a visible indicator. In related embodiments of the system, the visual indicator is (i) a pop-up notification displayed on a display of the user device or (ii) a text message. In such embodiments of the system, the pop-notification and text message provide identification of the first individual represented by the virtual object.

A computer-implemented method for providing authentication in a virtual reality computing environment defines second embodiments of the invention. The computer-implemented method is executed by one or more computing processor devices. The method includes presenting a virtual reality computing environment that includes (i) at least one sub-environment representing a corresponding entity that is non-human and (ii) one or more virtual objects in the least one sub-environment, each virtual object representing a corresponding first individual associated with the corresponding entity. The method further includes authenticating a virtual object from amongst the one or more virtual objects within a sub-environment from amongst the at least one sub-environment, wherein authenticating verifies the virtual object as representing a corresponding first individual associated with the entity. Further, the method includes obtaining a first sensory-perceptible indicator that indicates that the virtual object is authenticated as representing the corresponding first individual associated with the entity, and initiating communication of the first sensory-perceptible indicator to a user device associated with a user of the virtual reality application, wherein the user device is configured to receive and output the first sensory-perceptible indicator. In specific embodiments of the invention the first sensory-perceptible indicator is configured to be outputted by the user device external to the virtual reality computing environment.

In specific embodiments of the computer-implemented method, initiating communication further includes initiating communication of the first sensory-perceptible indicator to the user device in response to the user executing the virtual reality application and virtually coming in contact with or being proximate to the virtual objects from amongst the one or more virtual objects within the sub-environment. In such embodiments of the computer-implemented method, either (i) the user device is a first user device and the virtual reality application is executed on a second user device that is different than the first user device, or (ii) the virtual reality application is executed on the user device.

In other specific embodiments of the computer-implemented method, authenticating further includes authenticating a sub-environment from amongst the at least one sub-environment. The authentication verifies the sub-environment as representing a corresponding entity. In such related embodiments of the computer-implemented method, obtaining further includes obtaining the first sensory-perceptible indicator that further indicates that the sub-environment is authenticated as representing the corresponding entity. While in other related embodiments, the computer-related method further includes obtaining a second sensory-perceptible indicator that indicate that the sub-environment is authenticated as representing the corresponding entity and initiating communication of the second sensory-perceptible indicator to the user device associated with the user of the virtual reality application.

In still further specific embodiments of the computer-implemented method, obtaining further includes obtaining the first sensory-perceptible indicator as either (i) an audible indicator comprising (a) a predetermined sound, or (b) a recorded voice message that provides identification of the first individual represented by the virtual object, or (ii) a visible indicator comprising (a) a pop-up notification displayed on a display of the user device, or (b) a text message. The pop-notification and text message providing identification of the first individual represented by the virtual object.

A computer program product including a non-transitory computer-readable medium defines third embodiments of the invention. The computer-readable medium includes sets of codes for causing one or more computing processing devices to present a virtual reality computing environment that includes (i) at least one sub-environment representing a corresponding entity that is non-human and (ii) one or more virtual objects in the least one sub-environment, each virtual object representing a corresponding first individual associated with the corresponding entity. The sets of codes further include sets of codes for causing the computing processing device(s) to authenticate a virtual object from amongst the one or more virtual objects within a sub-environment from amongst the at least one sub-environment. Authenticating verifies the virtual object as representing a corresponding first individual associated with the entity. In addition, the sets of codes include sets of codes for causing the computing processing device(s) to obtain a first sensory-perceptible indicator that indicates that the virtual object is authenticated as representing the corresponding first individual associated with the entity, and initiate communication of the first sensory-perceptible indicator to a user device associated with a user of the virtual reality application, such that, the user device is configured to receive and output the first sensory-perceptible indicator. In specific embodiments of the computer program product, the first sensory-perceptible indicator is configured to be outputted by the user device external to the virtual reality computing environment.

In specific embodiments of the computer program product, the set of codes for causing the one or more computing processing devices to initiate communication are further configured to cause the one or more computing processor devices to initiate communication of the first sensory-perceptible indicator to the user device in response to the user executing the virtual reality application and virtually coming in contact with or being proximate to the virtual objects from amongst the one or more virtual objects within the sub-environment. In such embodiments of the computer program product, either (i) the user device is a first user device and the virtual reality application is executed on a second user device that is different than the first user device, or (ii) the virtual reality application is executed on the user device.

In still further specific embodiments of the computer program product, the set of codes for causing the one or more computing processing devices to authenticate are further configured to cause the one or more computing processing devices to authenticate a sub-environment from amongst the at least one sub-environment. Authenticating verifies the sub-environment as representing a corresponding entity. In such embodiments of the computer program product, the set of codes for causing the one or more computing processing devices to authenticate are further configured to cause the one or more computing processing devices to either obtain the first sensory-perceptible indicator that further indicates that the sub-environment is authenticated as representing the corresponding entity or obtain a second sensory-perceptible indicator that indicate that the sub-environment is authenticated as representing the corresponding entity.

Thus, according to embodiments of the invention, which will be discussed in greater detail below, the present invention provides for reverse authentication of (i) virtual objects (e.g., avatars or the like) located in or proximate to sub-environments of virtual reality computing environments and, in some embodiments, (ii) the sub-environments themselves. The virtual objects are authenticated as being associated with an individual/associate of the entity in control of the sub-environment and/or the sub-environments are authenticated as being associated with/controlled by the entity. In response to authentication, a sensory-perceptible indicator (e.g., audible, visual, haptic indicator) is obtained/generated, which is communicated to a user device that outputs the sensory-perceptible indicator to notify the virtual reality user that the virtual object and/or sub-environment has been authenticated. Communication of the sensory-perceptible indicator and/or output of the sensory-perceptible indicator on the user device may be external to the virtual reality computing environment and, as such, may be communicated to and/or outputted on a user device different than the user device on which the user's virtual reality experience occurs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
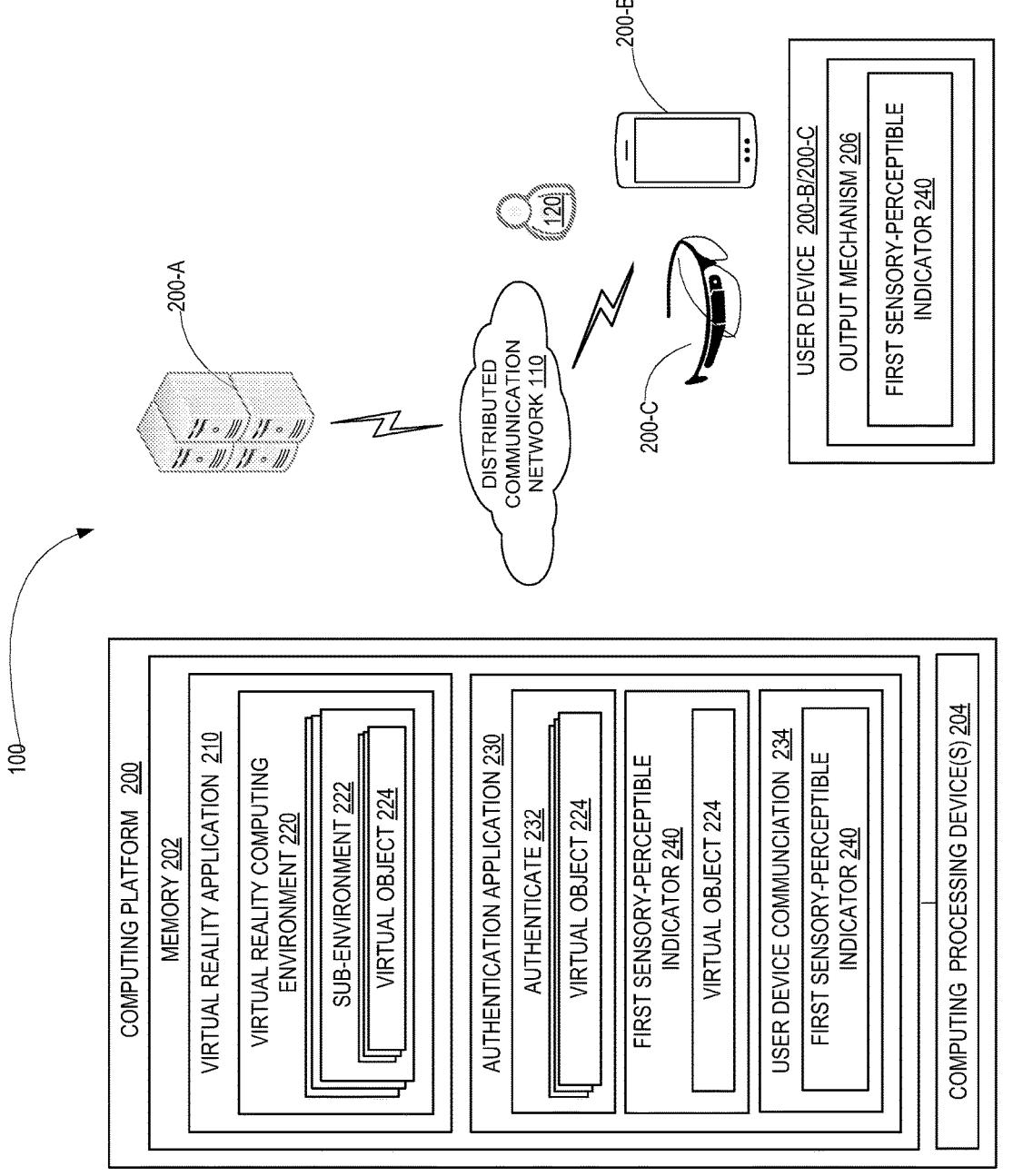
Figure 2:
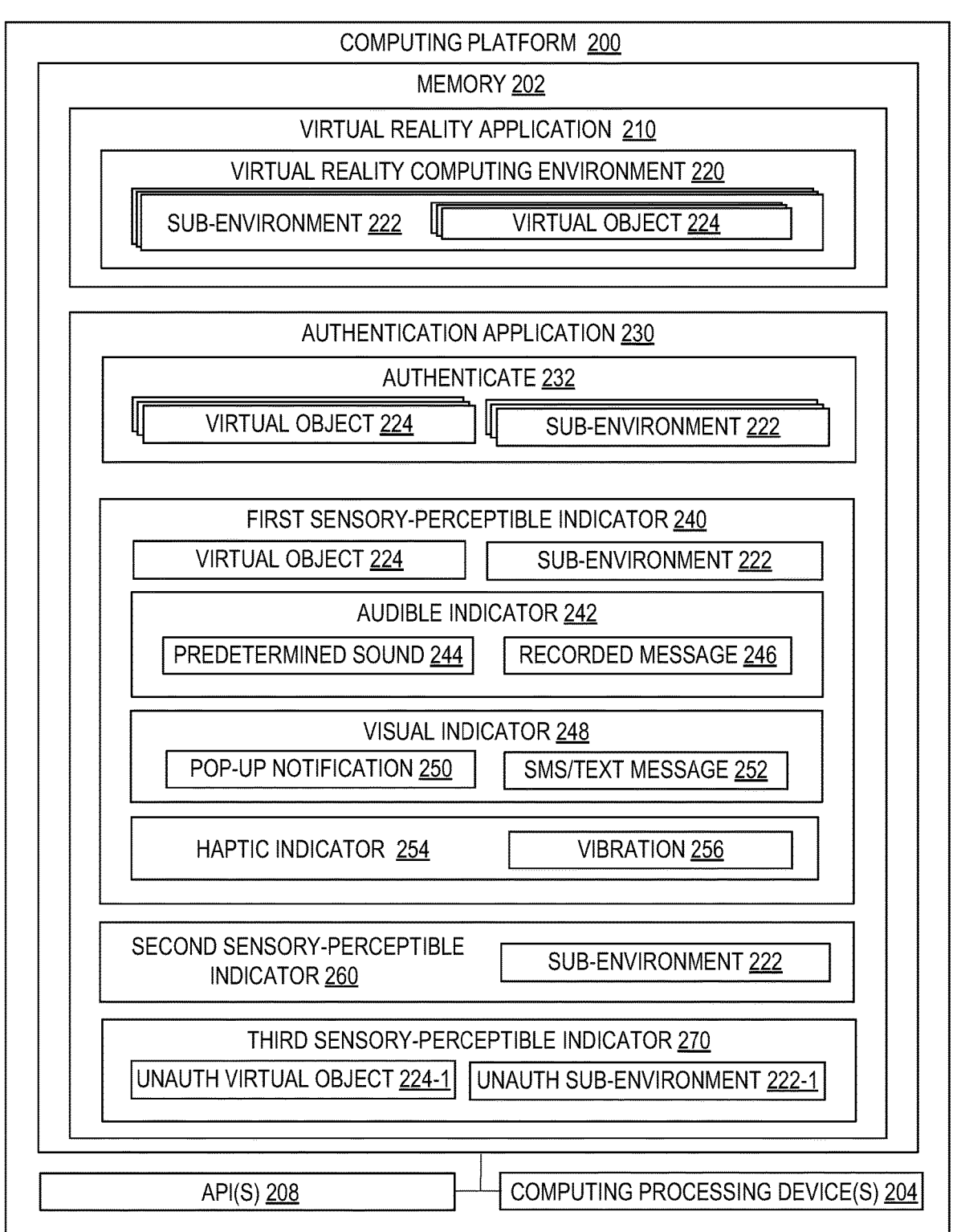
Figure 3:
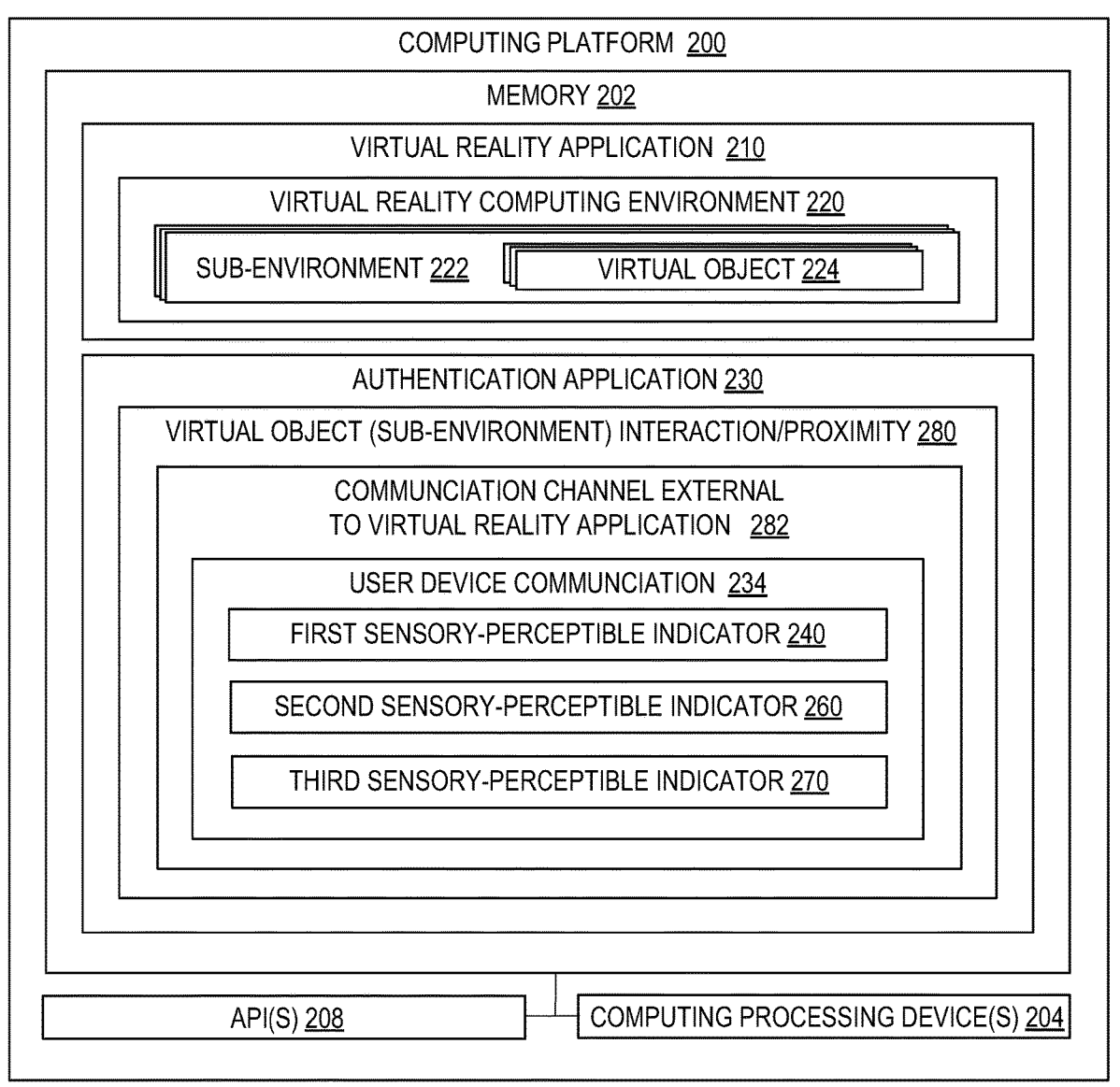

Having thus described embodiments of the disclosure in general terms, reference will now be made to the accompanying drawings, wherein:

FIG. 1 is a schematic/block diagram of system for authenticating virtual objects located in the sub-environments of a virtual reality computing environment and presenting the user with sensory-perceptible indicators that notify the user of the authentication, in accordance with embodiments of the present invention;

FIGS. 2 and 3 are block diagrams of a computing platform including a virtual reality application and an authentication application, in accordance with embodiments of the present invention; and FIG. 4 is a flow diagram of a method for authenticating virtual objects located in the sub-environments of a virtual reality computing environment and presenting the user with sensory-perceptible indicators that notify the user of the authentication, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "virtual reality computing environment", which includes augmented reality computing environments, such as Metaverse or the like may refer to a collection of persistent, shared, three-dimensional virtual spaces linked into a perceived virtual universe. In some embodiments, a virtual reality computing environment may not only refer to virtual worlds, but the Internet as a whole, including the spectrum of augmented reality. A virtual reality computing environment may include a number of different elements such as video conferencing, digital currencies, virtual reality platforms, social media, live data streaming, digital representations of real-life objects and/or the like. In some embodiments, a virtual reality computing environment may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

Further, as used herein, a "sub-environment" within a virtual reality computing environment refers to a specific zone, region, sub-verse or location within the overall environment, which has virtual boundaries. The "sub-environment" represents a corresponding entity, which is characteristically a non-human entity, such as an organization, a business, e.g., a resource-providing entity or the like. For example, the entity may be a financial institution, a retailer or the like. As used herein, the term "obtaining" includes generating/creating and/or retrieving from computing memory/storage.

As previously discussed, virtual reality computing environments pose potential security issues which may be different or otherwise heightened from conventional computing network/Internet security issues. Specifically, the virtually user navigating the virtual reality computing environment such as the Metaverse or the like may not know if a virtual object, such as an avatar representing an individual/associate of an entity and located within or proximate to a sub-environment/location controlled by that entity, is, in fact, a representative of the entity. Additionally, the virtually user may not know if the sub-environment/location they are visiting or proximate to is, in fact, the entity. In this regard, wrongdoers may hide behind virtual objects and attempt to masquerade as actual representatives of an entity or wrongdoers may create sub-environments that seek to impersonate a known entity.

Thus, according to embodiments of the invention, which will be described in more detail below, systems, methods and computer program products are disclosed that provide for reverse authentication, which provide the virtual user with sensory-perceptible indicators that serve to acknowledge that (i) virtual objects within a sub-environment have been verified/authenticated as being individuals/representatives of the entity represented by the sub-environment and, in some embodiments of the invention, (ii) the sub-environment itself has been verified/authenticated as being the entity.

Specifically, embodiments of the present invention authenticate the virtual object and/or sub-environment and, in response, obtain a sensory-perceptible indicator (e.g., audible, visual, haptic indicator or the like), which is communicated to a user device that outputs the sensory-perceptible indicator to notify the virtual reality computing environment user that the virtual object and/or sub-environment has been authenticated (i.e., the virtual object has been verified as being associated with an individual/representative of the entity in control of the sub-environment and/or the sub-environment has been verified as being associated with the entity).

In specific embodiments of the invention, the generation of and/or communication of the sensory-perceptible indicator is triggered by the virtual reality user (i.e., their respective virtual object/avatar) interacting with or being proximate to the virtual object and/or being located within or proximate to the sub-environment.

In other specific embodiments of the invention, the sensory-perceptible indicator is communicated to the user device and/or outputted by the user device external to the virtual reality computing environment (e.g., the sensory-perceptible indicator is communicated via the Internet or some other non-virtual reality network and/or is displayed, heard or otherwise experienced by the user outside of the virtual reality computing application/environment). As such, in specific embodiments of the invention, the sensory-perceptible indicator may be communicated to and/or outputted on the same user device that the virtual reality user is actively experiencing the virtual reality environment (e.g., virtual reality headset, smart glasses or the like), while in other embodiments of the invention the sensory-perceptible indicator may be communicated to and/or outputted on a different user device (e.g., smart phone or the like) other than the user device that conducting the virtual reality experience.

In specific embodiments of the invention, the sensory-perceptible indicator is an audible indicator. The audible indicator may be a predetermined sound, such as a ping or a chime that is played to indicate that the virtual object and/or sub-environment has been authenticated. In other instances, the audible indicator may be a recorded message, which may be dynamically generated to include the identity of the individual associated with the virtual object and/or the identity of the entity. In other specific embodiments of the invention, the sensory-perceptible indicator is an audible indicator is a visual indicator. The visual indicator may be a pop-up message displayed in the virtual reality computing environment or external to the virtual reality computing environment (e.g., a notification displayed on a smart phone). In addition, the visual indicator may be a text message (i.e., Short Message Service (SMS) message) or the like. The pop-up message or the text message may be configured to include the identity of the individual associated with the virtual object and/or the identity of the entity. Further, the visual indicator may be flashing lights or color changes of the virtual object and/or within the background of the sub-environment. In other specific embodiments of the invention, the sensory-perceptible indicator may be a haptic indicator, such as vibration provided to the user device. It should be noted that in additional embodiments of the invention any combination of visual, audible and haptic indicators may be used to notify the virtual reality user of the authentication of the virtual object and/or sub-environment.

In other embodiments of the invention, a sensory-perceptible indicator may be obtained or otherwise generated and communicated to the user device for output in response to the virtual reality user (i.e., their respective virtual object/avatar) interacting with or being proximate to a virtual object that has not been authenticated as being associated with an individual associated with the entity or a sub-environment that has not been authenticated as being associated with the entity. In this regard, the virtual reality user is notified when the virtual object/avatar that they are interacting with or are proximate to is a non-authenticated virtual object and/or the sub-environment they are located in or proximate to is an un-authenticated sub-environments. Such notifications may be in lieu of virtual object and/or sub-environment authentication notifications or, in other embodiments of the invention, in addition to virtual object and/or sub-environment authentication notifications Referring to FIG. 1, a schematic/block diagram is presented of a system 100 for authentication in a virtual reality computing environment, in accordance with embodiments of the invention. The system 100 is implemented within a distributed communication network 110, which may include the Internet, one or more intranets, one or more cellular networks or the like. The system 100 includes a computing platform 200 which may comprise network-based component(s), such as application server 200-A, user-based component(s) associated with a virtual reality computing environment user 120, such as mobile communication device 200-B or virtual reality headset 200-C or a combination of network-based components and user-based components. Computing platform 200 includes a memory 202 and one or more computing processing devices 204 in communication with memory 202. Memory 202 stores virtual reality application 210, which is executable by at least one of the one or more computing processor devices 204. As previous discussed for purposes of the present invention the phrase "virtual reality" includes the Metaverse, augmented reality and any other simulated human-like experience.

Virtual reality application 200 is configured to present, to user 120 via a user device, such as virtual reality headset 200-C, a virtual reality computing environment 220 that includes at least one, and typically a plurality of, sub-environment(s) 222 representing a corresponding entity that is non-human. For example, the entity may be an organization, a business or the like. As previously discussed, a sub-environment 222 is a region, zone, location or sub-verse with the overall virtual reality computing environment 220 having virtual boundaries. In addition, virtual reality computing environment 220 includes one or more virtual objects 224 (e.g., avatars or the like) located in or proximate to a corresponding one of the sub-environments 222. Each virtual object 224 represents a corresponding first individual/associate associated with the corresponding entity (i.e., a representative of the entity).

Memory 202 additionally stores authentication application 230 that is executable by at least one of the one or more computing processing devices 204. Authentication application 230 is configured to authenticate 232 the virtual objects 224 located in or proximate to corresponding sub-environments 222. Authenticate 232, as used herein, means that the virtual object is verified as representing an individual/associate of the corresponding entity (i.e., the sub-environment 222 in which the virtual object 224 is located in or proximate to). The virtual object 224 may be authenticated 232 by any known or future known authentication mechanism, such as, but not limited to, the individual/assigned to the virtual object providing physical characteristic data, (e.g., facial image, fingerprint or the like) or preassigned credentials, such as, but not limited to, username and passcode or the like.

In response to authenticating the virtual object 224, authentication application 230 is further configured to obtain (which may include generating) a first sensory-perceptible indicator 240 that indicates to a user that the virtual object is authenticated as representing the corresponding individual/associate associated with the entity. In response to obtaining the first sensory-perceptible indicator 240, authentication application 230 is configured to initiate user device communication of the first sensory-perceptible indicator 240 to the user 120. User device 200-B or 200-C is configured to receive the first sensory-perceptible indicator 240 and implement output mechanism 206 to present first sensory-perceptible indicator 240 to the user.

In specific embodiments of the invention, authentication application 230 is configured to initiate user device communication 234 of first sensory-perceptible indicator 240 external to the virtual reality application 210, while in other embodiments of the invention, authentication application 230 is configured to initiate user device communication 234 of first sensory-perceptible indicator 240 via virtual reality application 210. In this regard, in specific embodiments of the invention, the user device that receives and outputs the first sensory-perceptible indicator 240 may be a different user device (e.g., mobile communication device 200-B) than the user device on which the user is executing the virtual reality application 210 (e.g., virtual reality headset 200-C). Alternatively, in other embodiments of the invention, the user device that receives and outputs the first sensory-perceptible indicator 240 may be the same user device (e.g., virtual reality headset 200-C) that the user is executing the virtual reality application 210.

Referring to a FIGS. 2 and 3, block diagrams are presented of computing platform 200, in accordance with embodiments of the present invention. In addition to providing greater details of authentication application 230, FIGS. 2 and 3 highlight various alternate embodiments of the invention. Computing platform 200 may comprise one or multiple devices, such as servers, virtual reality devices or the like. Computing platform 200 includes memory 202, which may comprise volatile and/or non-volatile memory, such as read-only and/or random-access memory (RAM and ROM), EPROM, EEPROM, flash cards, or any memory common to computing platforms). Moreover, memory 202 may comprise cloud storage, such as provided by a cloud storage service and/or a cloud connection service.

Further, computing platform 200 includes one or more first computing processing devices 204, which may be an application-specific integrated circuit ("ASIC"), or other chipset, logic circuit, or other data processing device. Computing processing device(s) 204 may execute one or more application programming interface (APIs) 208 that interface with any resident programs, such as virtual reality application 210 and authentication application 230 or the like, stored in memory 202 of computing platform 200 and any external programs. Computing processing devices(s) 204 may include various processing subsystems (not shown in FIGS. 2 and 3) embodied in hardware, firmware, software, and combinations thereof, that enable the functionality of computing platform 200 and the operability of computing platform 200 on a distributed communication network 110 (shown in FIG. 1), such as the Intranet, intranet(s), cellular network(s) and the like. For example, processing subsystems allow for initiating and maintaining communications and exchanging data with other networked devices. For the disclosed aspects, processing subsystems of computing platform 200 may include any subsystem used in conjunction with virtual reality application 210 and authentication application 230 and related tools, routines, sub-routines, algorithms, sub-algorithms, sub-modules thereof.

In specific embodiments of the present invention, computing platform 200 additionally includes a communications module (not shown in FIGS. 2 and 3) embodied in hardware, firmware, software, and combinations thereof, that enables electronic communications between components of computing platform 200 and other networks and network devices. Thus, communication module may include the requisite hardware, firmware, software and/or combinations thereof for establishing and maintaining a network communication connection with one or more devices and/or networks.

Memory 202 of first computing platform 200 stores virtual reality application 210, which may be a network-based application or a local-application stored on a user device. As previously discussed in relation to FIG. 1, virtual reality application 210 is configured to present, to user 120 via user device 200-C (shown in FIG. 1 or the like), a virtual reality computing environment 220 that includes at least one, and typically a plurality of, sub-environment(s) 222 representing a corresponding entity that is non-human. For example, the entity may be an organization, a business or the like. As previously discussed, a sub-environment 222 is a region, location or zone within the overall virtual reality computing environment 220 having virtual boundaries. In addition, virtual reality computing environment 220 includes one or more virtual objects 224 (e.g., avatars or the like) located in or proximate to a corresponding one of the sub-environments 222. Each virtual object 224 represents a corresponding individual/associate associated with the corresponding entity (i.e., a representative of the entity).

Memory 202 additionally stores authentication application 230 that is configured to authenticate 232 (i) the virtual objects 224 in the sub-environments 222 and, in specific embodiments of the invention, (ii) the sub-environments. Authenticate 232, as used herein, means that the virtual object 224 is verified as representing an individual/associate of the corresponding entity (i.e., the sub-environment 222 in which the virtual object 224 is located in or proximate to) and, in specific embodiments of the invention, that the sub-environment 222 is verified as representing the entity. The virtual object 224 and/or sub-environment 22 may be authenticated 232 by any known or future known authentication mechanism, such as, but not limited to, the individual/assigned to the virtual object or an individual authorized to act on behalf of the entity (for purposes of sub-environment authentication) providing physical characteristic data, (e.g., facial image, fingerprint or the like) or preassigned credentials, such as, but not limited to, username and passcode or the like.

In response to authentication, authentication application 230 is configured to obtain a first sensory-perceptible indicator 240 obtain (which may include generate) a first sensory-perceptible indicator 240 that indicates to a user that the virtual object is authenticated as representing the corresponding individual/associate associated with the entity. In specific embodiments of the invention, first sensory-perceptible indicator, or any other sensory-perceptible indicator herein disclosed, is an audible indicator 242. Audible indicator 242 may be a predetermined sound 244, such as a ping or chime, which may be configured by the user 120 so that the user 120 recognizes the predetermined sound 244 as being associated with authentication. In other embodiments of the invention, audible indicator 242 may be a recorded message 246 that includes identification (e.g., name or the like) of the associate/individual to which the virtual object 224 is currently assigned. Recorded message 246 may be pre-recorded or dynamically recorded at the time of authentication. In those embodiments of the invention, in which the recorded message 246 is dynamically recorded at the time of authentication, the message may include a personalized greeting from the associate/individual to which the virtual object 224 is currently assigned and/or timely content.

In other embodiments of the invention, first sensory-perceptible indicator 240, or any other sensory-perceptible indicator herein disclosed, is a visual indicator 248. In such embodiments, visual indicator 248 may be a pop-up notification 250 displayed over the virtual reality environment or displayed on the home screen display of the user's mobile communication device. In other embodiments of the invention, visible indicator 248 may be a Short Message Service (SMS)/text message 252, which may be received and displayed by any network-accessible user device, such as virtual reality headset (200-C shown in FIG. 1) or mobile communication device (200-B shown in FIG. 1). Pop-up notification 250 and/or SMS/text message 252 may be configured to include identification (e.g., name) of the individual/associate and may include personalized or timely content.

In further embodiments of the invention, first sensory-perceptible indicator 240, or any other sensory-perceptible indicator herein disclosed, is a haptic indicator 254, such as vibration 256 which may be applied to any network-accessible user device, such as virtual reality headset (200-C shown in FIG. 1) or mobile communication device (200-B shown in FIG. 1). Further, it should be noted that first sensory-perceptible indicator 240 may include any combination of audio indicator 242, visual indicator 248 and haptic indicator 254

In other specific embodiments of the invention, authentication application 230 is further configured to obtain (which may include generate) a second sensory-perceptible indicator 260 that indicates to a user that the sub-environment is authenticated as representing the corresponding entity. Similar to first sensory-perceptible indicator 240 described above, second sensory perceptible indicator may be an audible indicator, a visual indicator, a haptic indication or any combination, therefore. In other related embodiments of the invention, first sensory-perceptible indicator 240 may be configured to indicate that both the visual object 224 and the sub-environment 222 have been authenticated, thus, obviating the need for second sensory-perceptible indicator 260.

In other specific embodiments of the invention, authentication application 230 is further configured to obtain (which may include generate) a third sensory-perceptible indicator 270 that indicates to a user that at least one of a virtual object 224 and/or a sub-environment 222 is an unauthorized virtual object 224-1 and/or unauthorized sub-environment 222-1. Configuration of third 270 sensory-perceptible indicator 260 may be at the discretion of user 120 and may be configured in lieu of or in addition to first sensory-perceptible indicators 240 and second sensory perceptible-indicators 260. Third sensory-perceptible indicator 270 serve to notify the user that a virtual object 224 and/or sub-environment 22 may be viewed as suspect, since the virtual object or sub-environment has either not undergone authentication or failed the authentication process.

As depicted in FIG. 3, in specific embodiments of the invention, authentication application 230 is configured to initiate user device communication of the first sensory-perceptible indicator 240, second sensory-perceptible indicator 260 and/or third sensory-perceptible indicator 270 to the user 120. In specific embodiments of the invention, user device communication 234 of the first, second and/or third sensory-perceptible indicator 240, 260, 270 is in response to the virtual object 224 interaction or proximity 280 (i.e., predetermined distance from the virtual object) or sub-environment 222 location or proximity (i.e., predetermined distance from exterior boundary of sub-environment. In additional embodiments, as previously discussed, user device communication 234 of the first, second and/or third sensory-perceptible indicator 240, 260, 270 is via a communication channel external 282 to the virtual reality application 210 (e.g., cellular network, Internet, or the like).

User device 200-B or 200-C is configured to receive the first, second and/or third sensory-perceptible indicator 240, 260, 270 and implement output mechanism 206 to present first sensory-perceptible indicator 240 to the user. As previously discussed, the user device that receives and outputs the first sensory-perceptible indicator 240 may be a different user device (e.g., mobile communication device 200-B) than the user device on which the user is executing the virtual reality application 210 (e.g., virtual reality headset 200-C). Alternatively, in other embodiments of the invention, the user device that receives and outputs the first sensory-perceptible indicator 240 may be the same user device (e.g., virtual reality headset 200-C) that the user is executing the virtual reality application 210. In this regard, in specific embodiments of the invention, first, second and/or third sensory-perceptible indicator 240, 260, 270 are outputted by a user device 200-B or 200-C external to the virtual reality application, while in other embodiments of the invention, first, second and/or third sensory-perceptible indicator 240, 260, 270 are outputted by a user device 200-C within the virtual reality application.

Referring to FIG. 4, a flow diagram is presented of a method 300 for authentication of virtual objects located in sub-environments of a virtual reality computing environment, in accordance with embodiments of the present invention. At Event 310, a virtual reality computing environment (otherwise referred to as the Metaverse and also including augmented reality computing environments) is presented to a user. The virtual reality computing environment includes one or more sub-environments, also referred to as zones, regions, sub-verses or bounded locations that represent a non-human entity, such as an organization, an agency, a business or the like. Additionally, the virtual reality computing environment includes one or more virtual objects (e.g., an avatar) located within a corresponding sub-environment that represents an individual associated with the entity.

At Event 320, a virtual object located in a corresponding sub-environment is authenticated (i.e., verified as being an individual representing the entity of the sub-environment). As discussed above, the authentication means may include, but is not limited to, comparison of captured physical characteristics or user credentials of an authorized individual/associate representative to known/verified physical characteristics or user credentials, and the like.

In response to authenticating the virtual object and, in some embodiments the virtual reality user (i.e., their virtual object/avatar) interacting with or being in proximity to the virtual object, at Event 330, a sensory-perceptible indicator is obtained or otherwise generated that indicates that a corresponding visual object in the corresponding sub-environment is authenticated. The sensory-perceptible indicators may be configured as visual indicators, audible indicator and/or haptic indicators. In specific embodiments of the invention, the sensory-perceptible indicator may be generated dynamically in response to virtual object authentication or in response to the user interacting with or being in proximity to the virtual object, In response to obtaining/generating the sensory-perceptible indicator, at Event 340, communication of the sensory-perceptible indicator to a user device is initiated. The communication channel may be external to the virtual reality application that the user is currently experiencing/executing. The user device is configured to receive the sensory-perceptible indicator and implement an output mechanism (e.g., speaker, display, vibration mechanism or the like) to output the sensory-perceptible indicator. As previously discussed, in specific embodiments of the method, the output of the sensory-perceptible indicator by the user device is external to/separate from the virtual reality application.

Thus, present embodiments of the invention discussed in detail above, provide for reverse authentication of (i) virtual objects (e.g., avatars or the like) located in or proximate to sub-environments of virtual reality computing environments and, in some embodiments, (ii) the sub-environments themselves. The virtual objects are authenticated as being associated with an individual/associate of the entity in control of the sub-environment and/or the sub-environments are authenticated as being associated with/controlled by the entity. In response to authentication, a sensory-perceptible indicator (e.g., audible, visual, haptic indicator) is obtained/generated, which is communicated to a user device that outputs the sensory-perceptible indicator to notify the virtual reality user that the virtual object and/or sub-environment has been authenticated. Communication of the sensory-perceptible indicator and/or output of the sensory-perceptible indicator on the user device may be external to the virtual reality computing environment and, as such, may be communicated to and/or outputted on a user device different than the user device on which the user's virtual reality experience occurs.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing authentication in a virtual reality computing environment, the system comprising:
   a computing platform including a memory and one or more computing processor devices in communication with the memory, wherein the memory stores:
   a virtual reality application executable by at least one of the one or more computing processor devices and configured to:
   present a virtual reality computing environment that includes at least one sub-environment representing a corresponding entity that is non-human and one or more virtual objects in the least one sub-environment, each virtual object representing a corresponding first individual associated with the corresponding entity; and
   an authentication application executable by at least one of the one or more computing processor devices and configured to:
   authenticate a virtual object from amongst the one or more virtual objects within a sub-environment from amongst the at least one sub-environment based on at least a comparison of captured physical characteristics of the first individual to known physical characteristics, wherein authenticating verifies the virtual object as representing a corresponding first individual associated with the entity,
   obtain a first sensory-perceptible indicator that indicates that the virtual object is authenticated as representing the corresponding first individual associated with the entity, and
   initiate communication of the first sensory-perceptible indicator to a user device associated with a user of the virtual reality application in response to the user executing the virtual reality application and virtually coming in contact with or being proximate to the virtual object from amongst the one or more virtual objects within the sub-environment, wherein the user device is configured to receive and output the first sensory-perceptible indicator, wherein the user device is a first user device and the virtual reality application is executed on a second user device that is different than the first user device.

2. The system of claim 1, wherein the virtual reality application is executed on the user device.

3. The system of claim 1, wherein the authentication application is further configured to initiate communication the sensory-perceptible indicator to the user device external to the virtual computing environment, and wherein the sensory-perceptible indicator is outputted by the user device external to the virtual computing environment.

4. The system of claim 1, wherein the authentication application is further configured to:
   authenticate a sub-environment from amongst the at least one sub-environment, wherein authenticating verifies the sub-environment as representing a corresponding entity.

5. The system of claim 4, wherein the authentication application is further configured to obtain the first sensory-perceptible indicator that further indicates that the sub-environment is authenticated as representing the corresponding entity.

6. The system of claim 4, wherein the authentication application is further configured to:

obtain a second sensory-perceptible indicator that indicate that the sub-environment is authenticated as representing the corresponding entity, and initiate communication of the second sensory-perceptible indicator to the user device associated with the user of the virtual reality application, wherein the user device is configured to receive and output the second sensory-perceptible indicator.

7. The system of claim 6, wherein the authentication application is configured to initiate communication of the second sensory-perceptible indicator to the user device in response to the user executing the virtual reality application and virtually coming in contact with or being proximate to the sub-environment.

8. The system of claim 1, wherein the authentication application is configured to obtain the first sensory-perceptible indicator, wherein the first sensory-perceptible indicator is an audible indicator, wherein the audible indicator is selected from the group consisting of (i) a predetermined sound, wherein the user device is configured to output the predetermined sound to notify the user that the virtual object is authenticated as representing the corresponding first individual associated with the entity and (ii) a recorded voice message that provides identification of the first individual represented by the virtual object.

9. The system of claim 1, wherein the authentication application is configured to obtain the first sensory-perceptible indicator, wherein the first sensory-perceptible indicator is a visible indicator, wherein the visible indicator is selected from the group consisting of (i) a pop-up notification displayed on a display of the user device and (ii) a text message, wherein the pop-up notification and text message provide identification of the first individual represented by the virtual object.

10. The system of claim 1, wherein the authentication application is further configured to:

obtain a second sensory-perceptible indicator that indicates that a virtual object from amongst the virtual objects in a corresponding sub-environment is not authenticated as representing an individual associated with the entity, and initiate communication of the second sensory-perceptible indicator to a user device associated with a user of the virtual reality application, wherein the user device is configured to receive and output the first sensory-perceptible indicator.

11. A computer-implemented method for providing authentication in a virtual reality computing environment, the method executed by one or more computing processor devices and comprising:

presenting a virtual reality computing environment that includes (i) at least one sub-environment representing a corresponding entity that is non-human and (ii) one or more virtual objects in the least one sub-environment, each virtual object representing a corresponding first individual associated with the corresponding entity;

authenticating a virtual object from amongst the one or more virtual objects within a sub-environment from amongst the at least one sub-environment based on at least a comparison of captured physical characteristics of the first individual to known physical characteristics, wherein authenticating verifies the virtual object as representing a corresponding first individual associated with the entity, obtaining a first sensory-perceptible indicator that indicates that the virtual object is authenticated as representing the corresponding first individual associated with the entity, and initiating communication of the first sensory-perceptible indicator to a user device associated with a user of a virtual reality application used to present the virtual reality computing environment in response to the user executing the virtual reality application and virtually coming in contact with or being proximate to the virtual object from amongst the one or more virtual objects within the sub-environment, wherein the user device is configured to receive and output the first sensory-perceptible indicator, wherein the user device is a first user device and the virtual reality application is executed on a second user device that is different than the first user device.

12. The computer-implemented method of claim 11, wherein authenticating further comprises authenticating a sub-environment from amongst the at least one sub-environment, wherein authenticating verifies the sub-environment as representing a corresponding entity and wherein obtaining further comprises obtaining the first sensory-perceptible indicator that further indicates that the sub-environment is authenticated as representing the corresponding entity.

13. The computer-implemented method of claim 11, wherein authenticating further comprises authenticating a sub-environment from amongst the at least one sub-environment, wherein authenticating verifies the sub-environment as representing a corresponding entity and wherein the computer-implemented method further comprises:

obtaining a second sensory-perceptible indicator that indicate that the sub-environment is authenticated as representing the corresponding entity; and initiating communication of the second sensory-perceptible indicator to the user device associated with the user of the virtual reality application, wherein the user device is configured to receive and output the second sensory-perceptible indicator.

14. The computer-implemented method of claim 11, wherein obtaining further comprises obtaining the first sensory-perceptible indicator, wherein the first sensory-perceptible indicator is chosen from group consisting of (i) an audible indicator comprising at least one chosen from group consisting of (a) a predetermined sound, and (b) a recorded voice message that provides identification of the first individual represented by the virtual object, and (ii) a visible indicator comprising at least one chosen from the group consisting of (a) a pop-up notification displayed on a display of the user device and (b) a text message, wherein the pop-up notification and text message provide identification of the first individual represented by the virtual object.

15. A computer program product comprising:

a non-transitory computer-readable medium comprising sets of codes for causing one or more computing processor devices to:

present a virtual reality computing environment that includes (i) at least one sub-environment representing a corresponding entity that is non-human and (ii) one or more virtual objects in the least one sub-environment, each virtual object representing a corresponding first individual associated with the corresponding entity;

authenticate a virtual object from amongst the one or more virtual objects within a sub-environment from amongst the at least one sub-environment based on at least a comparison of captured physical characteristics of the first individual to known physical characteristics, wherein authenticating verifies the virtual object as representing a corresponding first individual associated with the entity, obtain a first sensory-perceptible indicator that indicates that the virtual object is authenticated as representing the corresponding first individual associated with the entity, and initiate communication of the first sensory-perceptible indicator to a user device associated with a user of a virtual reality application used to present the virtual reality computing environment in response to the user executing the virtual reality application and virtually coming in contact with or being proximate to the virtual object from amongst the one or more virtual objects within the sub-environment, wherein the user device is configured to receive and output the first sensory-perceptible indicator external to the virtual reality computing environment, wherein the user device is a first user device and the virtual reality application is executed on a second user device that is different than the first user device.

16. The computer program product of claim 15, wherein the set of codes for causing the one or more computing processing devices to authenticate are further configured to cause the one or more computing processing devices to authenticate a sub-environment from amongst the at least one sub-environment, wherein authenticating verifies the sub-environment as representing a corresponding entity and wherein the set of codes for causing the one or more computing processing devices to authenticate are further configured to cause the one or more computing processing devices to either obtain the first sensory-perceptible indicator that further indicates that the sub-environment is authenticated as representing the corresponding entity or obtain a second sensory-perceptible indicator that indicate that the sub-environment is authenticated as representing the corresponding entity.

* * * * *